US011798328B2

(12) United States Patent
Kuenzi et al.

(10) Patent No.: US 11,798,328 B2
(45) Date of Patent: Oct. 24, 2023

(54) SYSTEM AND METHOD FOR MONITORING ACCESS TO A RESIDENTIAL STRUCTURE

(71) Applicant: Carrier Corporation, Palm Beach Gardens, FL (US)

(72) Inventors: Adam Kuenzi, Silverton, OR (US); Jay Corporon, Gresham, OR (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 63 days.

(21) Appl. No.: 17/513,816

(22) Filed: Oct. 28, 2021

(65) Prior Publication Data

US 2022/0207937 A1 Jun. 30, 2022

Related U.S. Application Data

(60) Provisional application No. 63/131,573, filed on Dec. 29, 2020.

(51) Int. Cl.
G07C 9/00 (2020.01)
G08B 13/196 (2006.01)
H04W 80/06 (2009.01)
G06Q 50/16 (2012.01)
G08B 13/16 (2006.01)

(52) U.S. Cl.
CPC ......... G07C 9/00309 (2013.01); G06Q 50/16 (2013.01); G07C 9/00571 (2013.01); G07C 9/00896 (2013.01); G08B 13/1672 (2013.01); G08B 13/1961 (2013.01); G08B 13/1966 (2013.01); H04W 80/06 (2013.01); G07C 2009/00325 (2013.01); G07C 2009/00793 (2013.01); G07C 2009/00936 (2013.01)

(58) Field of Classification Search
None
See application file for complete search history.

(56) References Cited

U.S. PATENT DOCUMENTS

| 6,472,973 | B1 | 10/2002 | Harold |
| 7,999,656 | B2 | 8/2011 | Fisher |
| 8,451,088 | B2 | 5/2013 | Fisher |
| 8,779,933 | B2 | 7/2014 | Hartmann et al. |
| 8,786,400 | B2 | 7/2014 | Harkins et al. |
| 8,912,884 | B2 * | 12/2014 | Fisher ............ G05B 1/00 |
| | | | 235/382 |
| 9,194,157 | B2 * | 11/2015 | Bahar ............ G06Q 10/063 |
| 9,478,083 | B2 | 10/2016 | Fisher |
| 9,600,696 | B2 | 3/2017 | Ebner |
| 9,670,694 | B2 | 6/2017 | Larson et al. |

(Continued)

OTHER PUBLICATIONS

Master Lock; "Master Lock® Continues Commitment To Advanced Security Solutions With Launch Of Bluetooth® Lock Box"; Cision PR Newswire; Jun. 14, 2017; 3 pages; https://www.prnewswire.com/news-releases/master-lock-continues-commitment-to-advanced-security-solutions-with-launch-of-bluetooth-lock-box-300473572.html.

Primary Examiner — K. Wong
(74) Attorney, Agent, or Firm — CANTOR COLBURN LLP

(57) ABSTRACT

Disclosed is a monitoring system, having: a keybox configured to store a key; a monitoring device, wherein via a monitoring device controller, the monitoring device is configured to: detect a first alert condition indicative of the keybox being outside a communication range of shortwave radio; and transmit a first alert to a remote implement that is indicative of an occurrence of the first alert condition.

13 Claims, 2 Drawing Sheets

(56) References Cited

U.S. PATENT DOCUMENTS

| | | | |
|---|---|---|---|
| 10,017,960 B2 * | 7/2018 | Kristensen | G07C 9/00309 |
| 10,249,121 B2 | 4/2019 | Desinor, Jr. | |
| 10,757,371 B2 | 8/2020 | Smith et al. | |
| 11,195,358 B2 * | 12/2021 | Moore | G07C 9/00896 |
| 11,257,315 B2 * | 2/2022 | Kuenzi | G07C 9/00571 |
| 2009/0153291 A1 | 6/2009 | Larson et al. | |
| 2009/0167526 A1 | 7/2009 | Graves et al. | |
| 2019/0371096 A1 | 12/2019 | Fisher | |

* cited by examiner

SYSTEM AND METHOD FOR MONITORING ACCESS TO A RESIDENTIAL STRUCTURE

CROSS-REFERENCE TO RELATED APPLICATIONS

This application claims the benefit of U.S. Provisional Patent Application No. 63/131,573 filed Dec. 29, 2020, which is incorporated herein by reference in its entirety.

BACKGROUND

The embodiments herein relate to monitoring systems and more specifically to a system and method for monitoring access to a residential structure.

A real estate agent may seek to show an available property to a potential buyer by opening a keybox located at the property to remove a stored key, thereby gaining access to one or more doors. There are, however, security risks associated with leaving the keybox with the key at the property over longer periods of time. There is a need by property owners and agents to show property, utilizing a keybox system, while minimizing security risks to the property.

BRIEF SUMMARY

Disclosed is a monitoring system, including: a keybox configured to store a key; a monitoring device, wherein via a monitoring device controller, the monitoring device is configured to: detect a first alert condition indicative of the keybox being outside a communication range of shortwave radio; and transmit a first alert to a remote implement that is indicative of an occurrence of the first alert condition.

In addition to one or more of the above disclosed aspects of the system, or as an alternate: the remote implement is one or more of a mobile device and a cloud service.

In addition to one or more of the above disclosed aspects of the system, or as an alternate: the monitoring device is configured to: communicate with the keybox, via a keybox controller, via a first wireless communication protocol and communicate with the remote implement via a second wireless communication protocol that differs from the first wireless communication protocol, wherein the first wireless communication protocol is a personal area network protocol and the second wireless communication protocol includes one or more of TCP/IP protocol and cellular protocol.

In addition to one or more of the above disclosed aspects of the system, or as an alternate: the monitoring device is configured to: determine that the keybox is outside the communication range upon failing to receive a periodic transmission from the keybox.

In addition to one or more of the above disclosed aspects of the system, or as an alternate: the monitoring device is configured to: detect, via one or more sensors operationally connected to the monitoring device, a second alert condition that is indicative of one or more of motion and sound in the communication range that is above a respective threshold; and transmit a second alert to the remote implement indicative of the occurrence of the second alert condition unless the monitoring device first detects a recognized mobile device within the communication range or receives notification from the keybox indicative of the recognized mobile device being within the communication range.

In addition to one or more of the above disclosed aspects of the system, or as an alternate: the one or more sensors are disposed within a housing of the monitoring device in which the monitoring device controller is housed; or the one or more sensors are spaced apart from the monitoring device and are configured to communicate wirelessly with the monitoring device.

In addition to one or more of the above disclosed aspects of the system, or as an alternate: the monitoring device is configured to: transmit, with the second alert, recorded or streamed activity data of one or more of audible and visible activities to the remote implement, wherein the recorded or streamed activity data is obtained from the one or more sensors operationally connected to the monitoring device.

In addition to one or more of the above disclosed aspects of the system, or as an alternate: the recorded or streamed activity includes one or more of: sound data, recorded or streamed from an audio sensor operationally connected to the monitoring device; and image data, recorded or streamed from an image sensor operationally connected to the monitoring device.

In addition to one or more of the above disclosed aspects of the system, or as an alternate, the system includes: a plurality of monitoring devices, including the monitoring device, spaced apart from each other within the communication range, wherein the monitoring device is configured to: communicate wirelessly with the plurality of monitoring devices; receive a transmission of the occurrence of the first or second alert conditions from one or more of the plurality of monitoring devices; and transmit to the remote implement the occurrence of the first or second alert conditions.

In addition to one or more of the above disclosed aspects of the system, or as an alternate, the system includes: a smart lock configured to wirelessly communicate with the monitoring device to notify of a door opening status.

Further disclosed is a method of monitoring a keybox with a monitoring system, wherein the keybox configured to store a key, the method including a monitoring device, via a monitoring device controller: detecting a first alert condition indicative of the keybox being outside a communication range of shortwave radio; and transmitting a first alert to a remote implement that is indicative an occurrence of the first alert condition.

In addition to one or more of the above disclosed aspects of the method, or as an alternate: the remote implement is one or more of a mobile device and a cloud service.

In addition to one or more of the above disclosed aspects of the method, or as an alternate, the method includes the monitoring device: communicating with the keybox, via a keybox controller, via a first wireless communication protocol and communicating with the remote implement via a second wireless communication protocol that differs from the first wireless communication protocol, wherein the first wireless communication protocol is a personal area network protocol and the second wireless communication protocol includes one or more of TCP/IP protocol and cellular protocol.

In addition to one or more of the above disclosed aspects of the method, or as an alternate, the method includes the monitoring device: determining that the keybox is outside the communication range upon failing to receive a periodic transmission from the keybox.

In addition to one or more of the above disclosed aspects of the method, or as an alternate, the method includes the monitoring device: detecting, via one or more sensors operationally connected to the monitoring device, a second alert condition that is indicative of one or more of motion and sound in the communication range that is above a respective threshold; transmitting a second alert to the remote implement indicative of the occurrence of the second alert condition unless the monitoring device first detects a recognized mobile device within the communication range or receives notification from the keybox indicative of the recognized mobile device being within the communication range.

In addition to one or more of the above disclosed aspects of the method, or as an alternate: the one or more sensors are disposed within a housing of the monitoring device in which the monitoring device controller is housed; or the one or more sensors are spaced apart from the monitoring device, and the method includes the monitoring device: communicating wirelessly with the one or more sensors.

In addition to one or more of the above disclosed aspects of the method, or as an alternate, the method includes the monitoring device: transmitting, with the second alert, recorded or streamed activity data of one or more of audible and visible activities to the remote implement, wherein the recorded or streamed activity data is obtained from the one or more sensors operationally connected to the monitoring device.

In addition to one or more of the above disclosed aspects of the method, or as an alternate: the recorded or streamed activity includes one or more of sound data, recorded or streamed from an audio sensor operationally connected to the monitoring device; and image data, recorded or streamed from an image sensor operationally connected to the monitoring device.

In addition to one or more of the above disclosed aspects of the method, or as an alternate: a plurality of monitoring devices, including the monitoring device, are spaced apart from each other within the communication range, wherein the method includes the monitoring device: communicating wirelessly with the plurality of monitoring devices; receiving a transmission of the occurrence of the first or second alert conditions from one or more of the plurality of monitoring devices; and transmitting to the remote implement the occurrence of the first or second alert conditions.

In addition to one or more of the above disclosed aspects of the method, or as an alternate, the method includes: a smart lock wirelessly communicating with the monitoring device to notify of a door opening status.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
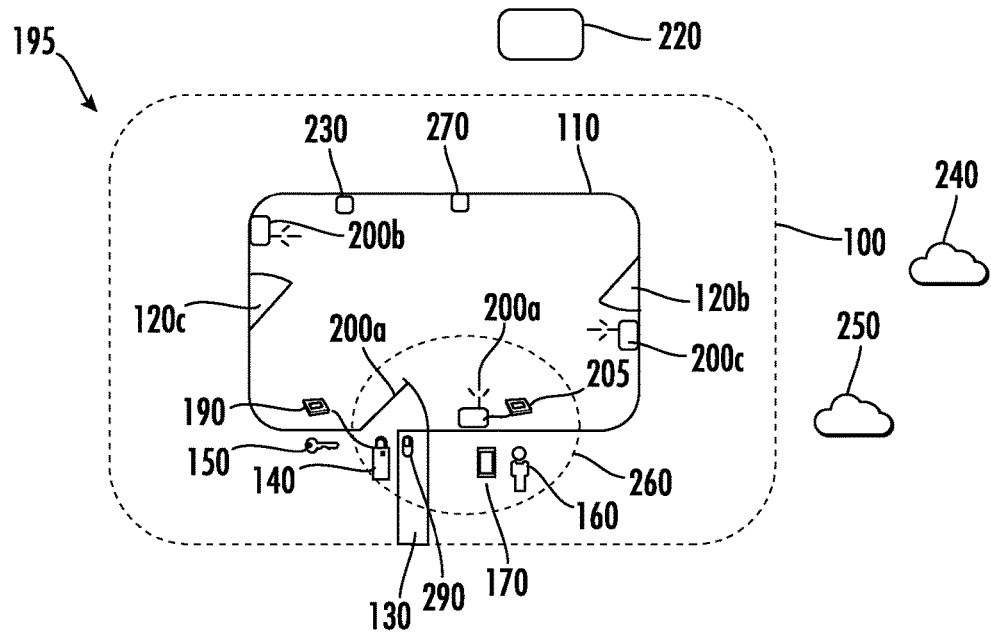
FIG. 1 shows a property containing a monitoring system according to a disclosed embodiment.

FIG. 1 shows a property 100 having a structure 110 such as a residential house. The structure 110 may have openings 120A-C such as doors and windows, e.g., where a first opening (a font door) 120A accessible via a walkway 130. The house may be vacant, e.g., because it may be for sale, or for other reasons. In such case, a keybox 140 may be placed by the front door 120A. The keybox 140 may have therein a key 150 used by an agent 160. To access the keybox 140 an agent 160 (e.g., a realtor) may use a mobile device 170 (phone, tablet, etc.) that is configured to communicate with the key box 140 via, e.g., personal area network (PAN) protocols, such as Bluetooth, utilizing shortwave radio. The keybox 140, operating through, e.g., a keybox controller or processor 190, may recognize credentials provided by the mobile device 170, e.g., utilizing an applicable App (software application available via an on-line app store or otherwise) and unlock to allow access to the key 150.

There may be instances where an unauthorized person may seek to take the keybox 140 with the key 150 off the property 100 to gain unauthorize access to the structure 110. There also may be instances where such unauthorized person may seek to bypass the key 150 and enter the structure 110 via one of the openings 120A-C. Such unauthorized entry may include picking a lock of a door or window, or breaking a glass of a door or window to manipulate a door or window latch within the structure 110.

Figure 2:
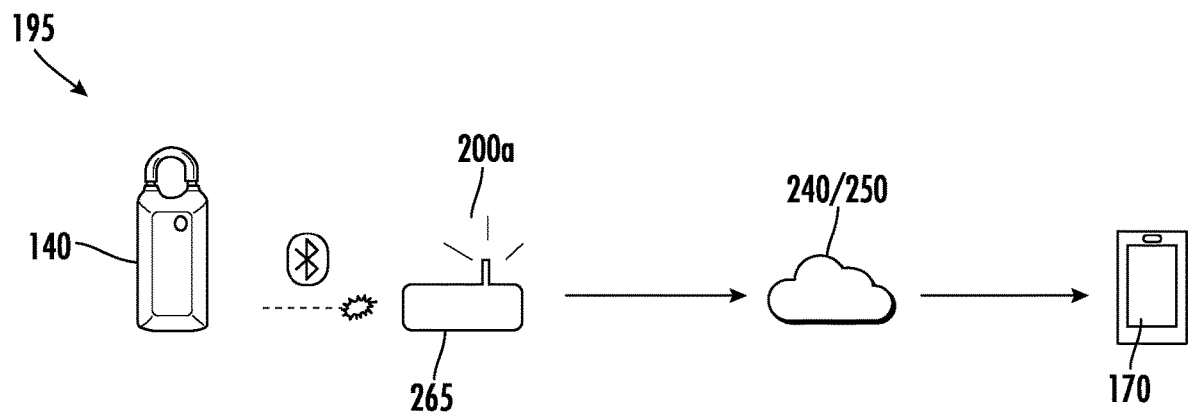
FIG. 2 is a process map showing an operational process of components of the monitoring system according to a disclosed embodiment.

To address these issues, as shown in FIGS. 1 and 2, the disclosed embodiments provide a monitoring system 195 that includes, e.g., a monitoring device 200A having a monitoring device controller 205 therein to operationally control the aspects of the monitoring device 200A identified herein. The monitoring device 200A may be configured to communicate directly with the keybox 140 and the mobile device 170 using PAN protocols. In one embodiment, for enhanced security, the monitoring device 200A is conjured to respond only to the keybox 140, as compared with, e.g., other keyboxes. In such embodiment, the keybox 140 includes a unique identifier. Options for the unique identifier include, e.g., a Bluetooth Address, a data parameter included in a Bluetooth advertisement that indicates a unique identifier, a TCP/IP address, etc. For example, when installing the keybox 140 at a property along with a monitoring device 200A, the mobile device 170 could communicate with both the keybox 140 and the monitoring device 200A to tell them to 'trust' each other. Alternatively, the keybox 140 could be Bluetooth paired with the monitoring device 200A so that the monitoring device 200A knows the keybox 140 and trusts it. Such action may prevent an unwanted third party from using its own keybox to trick the monitoring device 200A.

The monitoring device 200A may be configured to communicate with a remote implement 220 which may include the mobile device 170 as well as other types of remote implements. For example, the remote device 220 may be a mobile device for the property owner, a selling agent, a property management service, an alarm service or other cloud service. The remote device 220 alternatively may be an actual annunciating alarm on the premise, local law enforcement, etc. Communications between the monitoring device 200A and the remote implement 220 may be enabled by a network access point 230, located in the structure 110, that is connected to the internet 240. That is, the monitoring device 200A and the network access point 230 may be connected through standard protocols, e.g. TCP/IP, HTTPS, etc. protocols. The monitoring device may otherwise connect to the remote implement 220 via a cellular network 250, e.g., applying cellular protocols. Other Internet Of Things (IoT) connections and remote monitoring services are within the scope of the disclosure.

The monitoring device 200A may be able to determine when the keybox 140 is outside a communication range 260 of the shortwave radio, e.g., when its Bluetooth connection fails. For example, the monitoring device 200A may receive periodic advertisements from the keybox 140 utilizing the PAN protocols. The Bluetooth advertisement may contain information. For example, the keybox 140 may indicate its status to the monitoring device 200A. The keybox 140 may indicate that it is closed/locked or is authorized/open and also indicate whether the keys are in/out of the keybox 140. The monitoring device 200A can use this information to make decisions. Thus, in one embodiment, when the advertisements from the keybox 140 are no longer received for a period of time greater than a threshold, e.g., a few minutes, the monitoring device 200 may make the determination that the keybox 140 is outside of range. At this time, the monitoring device 200A may send an alert to the remote implement 220, which is shown as the mobile device 170, via the internet 240 or cellular network 250.

The monitoring device 200A may also have within its housing 265 (FIG. 2), or be in wired or wireless communication with, a sensor 270. The sensor 270 may also be within the keybox 140 to detect, for example, if the keybox 140 is being handled by an unauthorized third part. The sensor 270, within the structure 110 may detect, e.g., vibration, motion and sound, e.g., above a respective threshold. Thus, the sensor 270 may detect engagement with any one of the openings 120A-C. In situations where neither the keybox 140 nor the monitoring device 200A is actively engaging over a shortwave radio with the mobile device 170 (or other registered mobile device), and the monitoring device 200A detects access into the structure 110 via the sensor 270, the monitoring device 200A may determine that unauthorized access is occurring. At this time, the monitoring device 200A may transmit an alert to the remote implement 220. In an embodiment, the monitoring device 200A may be able to record and transmit, or livestream, video (via an image sensor) and sound (via an audio sensor) with the alert transmission. In one embodiment the monitoring device 200A may have a speaker that can provide an audible alarm during an alert condition, for example, or provide for two way communications between itself and the remote implement 220. In one embodiment, the front door 120A includes a smart lock 290 that may communicate with the monitoring device 200A, utilizing PAN protocols, to notify of duress or door opening status.

In one embodiment, a plurality of monitoring devices 200A-C, including the monitoring device 200A, are in the structure 110. The monitoring devices 200A-C may be spaced apart from each other and networked via PAN protocols or TCP/IP protocols, for example. The monitoring device 200A may function as the primary device among the monitoring devices 200A-C, configured to receive alerts, sound and video from the other (secondary) devices and transmit the same to the remote implement 220 during an alert condition. Alternatively, each of the monitoring devices 200A-C may communicate directly with the remote implement 220. In addition, if any one of the monitoring devices 200A-200C engages with the mobile device 170 via PAN protocols, that device may notify the other monitoring devices. This may avoid an unnecessary tripping of an alert condition, e.g. if the agent 160 bypasses the keybox 140 and enters with a spare key.

Alternatively, the keybox 140, upon engaging with the mobile device 170 via PAN protocols, may transmit to the monitoring devices 200A-C (or monitoring device 200A in the absence of a network of monitoring devices 200A-200C) a disarm command so that entry within a predetermined period of time, such a few minutes, will not trigger an alert condition. As an alternative to a disarm command from the mobile device 170, the keybox 170 may change its Bluetooth advertisement to indicate, in the advertisement a recent event, such as the authorized opening of the keybox 140. The monitoring device 200A may automatically infer that it should disarm based upon the authorized keybox event. Then, re-arming may be accomplished via a timer executed by the monitoring device 200A, or via a further change in the Bluetooth advertisement by the keybox 140 when the keys are returned to it.

Figure 3:
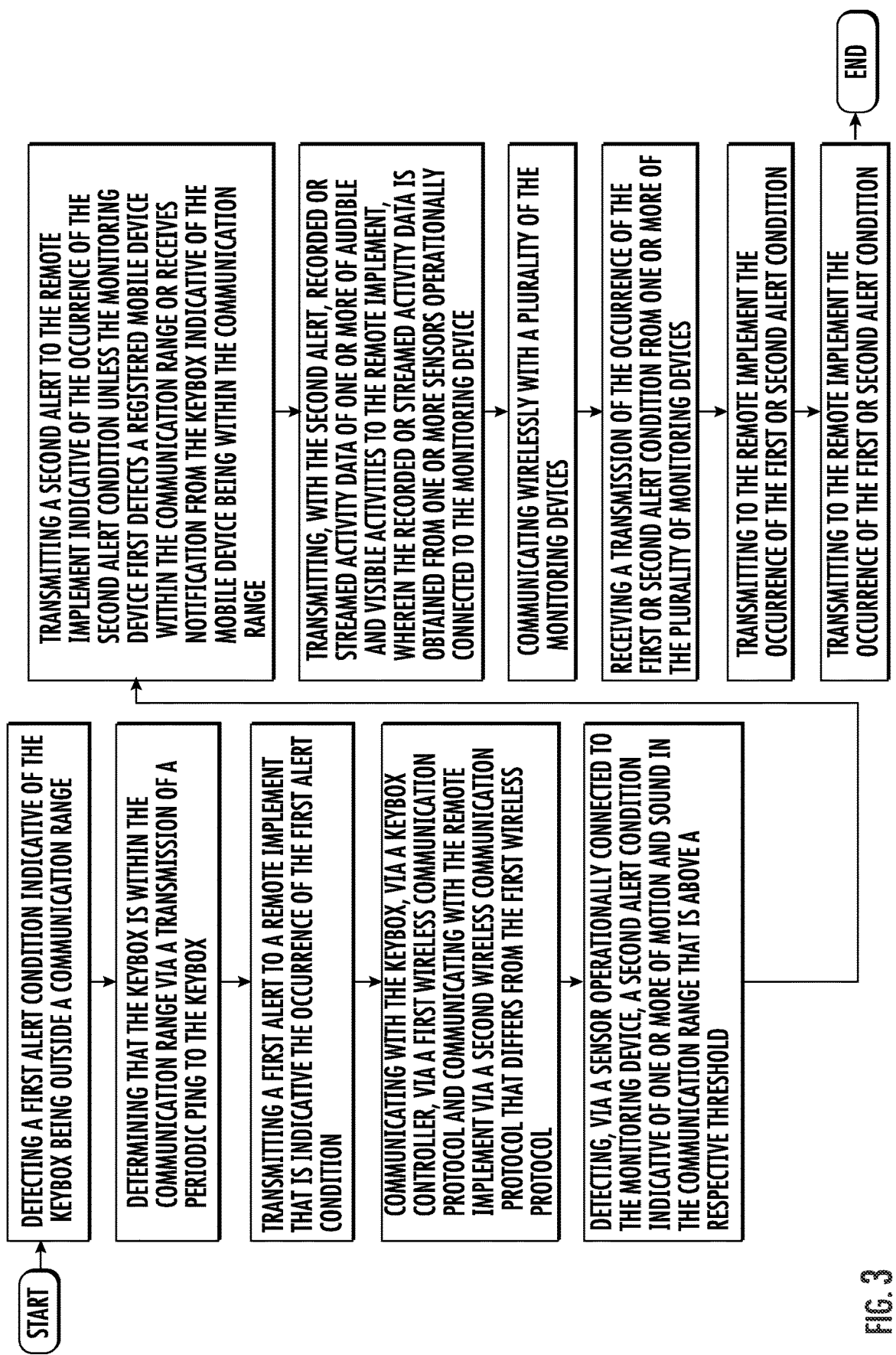
FIG. 3 is a flowchart showing a method of monitoring a property with a monitoring system according to a disclosed embodiment.

Turning to FIG. 3 a flowchart shows a method of monitoring using the disclosed monitoring system 195. As shown in block 310 the method includes the monitoring device 200 detecting a first alert condition indicative of the keybox 140 being outside a communication range. As shown in block 320, the method includes the monitoring device 200 determining that the keybox 140 is outside the communication range upon failing to receive a transmission of a periodic advertisement from the keybox 140. As shown in block 330, the method includes the monitoring device 200 transmitting a first alert to the remote implement 220 that is indicative the occurrence of the first alert condition. As shown in block 340, the method includes the monitoring device 200 communicating with the keybox 140 via the first wireless communication protocol, e.g., a PAN protocol, and communicating with the remote implement via the second wireless communication protocol, e.g., a TCP/IP or cellular protocol.

As shown in block 350, the method includes the monitoring device 200 detecting, via a sensor 270 operationally connected to the monitoring device 200, a second alert condition indicative of one or more of motion and sound in the communication range that is above a respective threshold. As shown in block 360, the method includes the monitoring device 200 transmitting a second alert to the remote implement 220 indicative of the occurrence of the second alert condition, unless the monitoring device 200 first either detects the mobile device 170, which is recognized as it has been registered with the monitoring system 195, within the communication range or receives notification from the keybox 140 indicative of the mobile device 170 being within the communication range. As shown in block 370, the method includes the monitoring device 200 transmitting, with the second alert, recorded or streamed activity data of one or more of audible and visible activities to the remote implement 220. The recorded or streamed activity data is obtained from one or more sensors 270 operationally connected to the monitoring device 200A.

As shown in block 380, the method includes the monitoring device 200 communicating wirelessly with the plurality of the monitoring devices 200A-200C. As shown in block 390, the method includes the monitoring device 200 receiving a transmission of the occurrence of the first or second alert condition from one or more of the plurality of monitoring devices 200A-200C. As shown in block 400, the method includes the monitoring device 200 transmitting to the remote implement 220 the occurrence of the first or second alert condition. A shown in block 410, the method includes smart lock 290 wirelessly communicating with the monitoring device 200 to notify of a door opening status.

The above disclosed embodiments provide a monitoring device 200A that is mounted inside the structure 110, within Bluetooth range of the keybox 140, which is configured to listens for Bluetooth low energy (BTLE) advertisements. If the keybox 14 is missing, the monitoring device 200A may then report the alarm condition via cellular, IoT, through alarm system, etc. The monitoring device 200 may have a glass-break sensor, etc. for additional intrusion detection. When the keybox 140 is opened legitimately by a registered/recognized mobile device 170, the monitoring device 200A, due to communicating with either of the keybox 140 or mobile device 170 via PAN protocols, will not trigger an alert, i.e., it will disarm. The monitoring device 200A may include a door open sensor, e.g., a trip beam, and/or a motion sensor for additional intrusion sensing. The monitoring device 200A may include camera capabilities for taking pictures of the moment of intrusion. Networked monitoring devices 200A-200C may be provide, e.g., distributed in large house, having multiple ways in. The monitoring devices 200A-200C may together, or via a primary one of the monitoring devices, report to an enterprise monitoring system (remote implement 220). In one embodiment, the door includes a smart lock that may communicate with the monitoring device 200A to notify of duress or door opening status. The embodiments may provide peace of mind due to providing an alert if someone is breaking into a home.

Sensor data from sensors identified above may be obtained and processed separately, or simultaneously and stitched together, or a combination thereof, and may be processed in a raw or complied form. The sensor data may be processed on the sensor (e.g. via edge computing), by controllers identified or implicated herein, on a cloud service, or by a combination of one or more of these computing systems. The senor may communicate the data via wired or wireless transmission lines, applying one or more protocols as indicated below.

Wireless connections may apply protocols that include local area network (LAN, or WLAN for wireless LAN) protocols. LAN protocols include WiFi technology, based on the Section 802.11 standards from the Institute of Electrical and Electronics Engineers (IEEE). Other applicable protocols include Low Power WAN (LPWAN), which is a wireless wide area network (WAN) designed to allow long-range communications at a low bit rates, to enable end devices to operate for extended periods of time (years) using battery power. Long Range WAN (LoRaWAN) is one type of LPWAN maintained by the LoRa Alliance, and is a media access control (MAC) layer protocol for transferring management and application messages between a network server and application server, respectively. LAN and WAN protocols may be generally considered TCP/IP protocols (transmission control protocol/Internet protocol), used to govern the connection of computer systems to the Internet. Wireless connections may also apply protocols that include private area network (PAN) protocols. PAN protocols include, for example, Bluetooth Low Energy (BTLE), which is a wireless technology standard designed and marketed by the Bluetooth Special Interest Group (SIG) for exchanging data over short distances using short-wavelength radio waves. PAN protocols also include Zigbee, a technology based on Section 802.15.4 protocols from the IEEE, representing a suite of high-level communication protocols used to create personal area networks with small, low-power digital radios for low-power low-bandwidth needs. Such protocols also include Z-Wave, which is a wireless communications protocol supported by the Z-Wave Alliance that uses a mesh network, applying low-energy radio waves to communicate between devices such as appliances, allowing for wireless control of the same.

Wireless connections may also include radio-frequency identification (RFID) technology, used for communicating with an integrated chip (IC), e.g., on an RFID smartcard. In addition, Sub-1 Ghz RF equipment operates in the ISM (industrial, scientific and medical) spectrum bands below Sub 1 Ghz—typically in the 769-935 MHz, 315 Mhz and the 468 Mhz frequency range. This spectrum band below 1 Ghz is particularly useful for RF IOT (internet of things) applications. The Internet of things (IoT) describes the network of physical objects—"things"—that are embedded with sensors, software, and other technologies for the purpose of connecting and exchanging data with other devices and systems over the Internet. Other LPWAN-IOT technologies include narrowband internet of things (NB-IOT) and Category M1 internet of things (Cat M1-TOT). Wireless communications for the disclosed systems may include cellular, e.g. 2G/3G/4G (etc.). The above is not intended on limiting the scope of applicable wireless technologies.

Wired connections may include connections (cables/interfaces) under RS (recommended standard)-422, also known as the TIA/EIA-422, which is a technical standard supported by the Telecommunications Industry Association (TIA) and which originated by the Electronic Industries Alliance (EIA) that specifies electrical characteristics of a digital signaling circuit. Wired connections may also include (cables/interfaces) under the RS-232 standard for serial communication transmission of data, which formally defines signals connecting between a DTE (data terminal equipment) such as a computer terminal, and a DCE (data circuit-terminating equipment or data communication equipment), such as a modem. Wired connections may also include connections (cables/interfaces) under the Modbus serial communications protocol, managed by the Modbus Organization. Modbus is a master/slave protocol designed for use with its programmable logic controllers (PLCs) and which is a commonly available means of connecting industrial electronic devices. Wireless connections may also include connectors (cables/interfaces) under the PROFibus (Process Field Bus) standard managed by PROFIBUS & PROFINET International (PI). PROFibus which is a standard for fieldbus communication in automation technology, openly published as part of IEC (International Electrotechnical Commission) 61158. Wired communications may also be over a Controller Area Network (CAN) bus. A CAN is a vehicle bus standard that allow microcontrollers and devices to communicate with each other in applications without a host computer. CAN is a message-based protocol released by the International Organization for Standards (ISO). The above is not intended on limiting the scope of applicable wired technologies.

When data is transmitted over a network between end processors as identified herein, the data may be transmitted in raw form or may be processed in whole or part at any one of the end processors or an intermediate processor, e.g., at a cloud service (e.g. where at least a portion of the transmission path is wireless) or other processor. The data may be parsed at any one of the processors, partially or completely processed or complied, and may then be stitched together or maintained as separate packets of information. Each processor or controller identified herein may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory identified herein may be but is not limited to a random access memory (RAM), read only memory (ROM), or other electronic, optical, magnetic or any other computer readable medium. Embodiments can be in the form of processor-implemented processes and devices for practicing those processes, such as processor. Embodiments can also be in the form of computer code based modules, e.g., computer program code (e.g., computer program product) containing instructions embodied in tangible media (e.g., non-transitory computer readable medium), such as floppy diskettes, CD ROMs, hard drives, on processor registers as firmware, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an device for practicing the exemplary embodiments. When implemented on a general-purpose microprocessor, the computer program code segments configure the microprocessor to create specific logic circuits.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A monitoring system, comprising:
a keybox configured to store a key;
a monitoring device, wherein via a monitoring device controller, the monitoring device is configured to:
communicate with the keybox over a personal area network that applies a first communications protocol;
detect a first alert condition indicative of the keybox being outside a communication range of the personal area network upon failing to receive a periodic transmission from the keybox; and
transmit a first alert to a remote implement that is indicative of an occurrence of the first alert condition;
the monitoring device is configured to:
detect, via sensors operationally connected to the monitoring device, a second alert condition that is indicative of motion and sound in the communication range that is above a respective threshold; and
transmit a second alert to the remote implement indicative of the occurrence of the second alert condition unless the monitoring device first detects a recognized mobile device within the communication range of the personal area network or receives notification from the keybox indicative of the recognized mobile device being within the communication range;
transmit, with the second alert, recorded or streamed activity data of audible and visible activities to the remote implement, wherein the recorded or streamed activity data is obtained from the sensors operationally connected to the monitoring device; and
the recorded or streamed activity includes: sound data, recorded or streamed from an audio sensor operationally connected to the monitoring device; and image data, recorded or streamed from an image sensor operationally connected to the monitoring device.

2. The system of claim 1, wherein: the remote implement is one or more of a mobile device and a cloud service.

3. The system of claim 1, wherein:
the monitoring device is configured to:
communicate with the keybox, via a keybox controller, via the first wireless communication protocol and communicate with the remote implement via a second wireless communication protocol that differs from the first wireless communication protocol,
wherein the second wireless communication protocol comprises one or more of TCP/IP protocol and cellular protocol.

4. The system of claim 1, wherein:
the monitoring device is configured to:
determine that the keybox is outside the communication range upon failing to receive a periodic transmission from the keybox.

5. The system of claim 1, wherein:
the one or more sensors are disposed within a housing of the monitoring device in which the monitoring device controller is housed; or
the one or more sensors are spaced apart from the monitoring device and are configured to communicate wirelessly with the monitoring device.

6. The system of claim 1, comprising:
a plurality of monitoring devices, including the monitoring device, spaced apart from each other within the communication range,
wherein the monitoring device is configured to:
communicate wirelessly with the plurality of monitoring devices;
receive a transmission of the occurrence of the first or second alert conditions from one or more of the plurality of monitoring devices; and
transmit to the remote implement the occurrence of the first or second alert conditions.

7. The system of claim 1, comprising:
a smart lock configured to wirelessly communicate with the monitoring device to notify of a door opening status.

8. A method of monitoring a keybox with a monitoring system,
wherein the keybox configured to store a key,
the method including a monitoring device, via a monitoring device controller:
communicating with the keybox over a personal area network that applies a first communications protocol;
detecting a first alert condition indicative of the keybox being outside a communication range of shortwave radio upon failing to receive a periodic transmission from the keybox; and
transmitting a first alert to a remote implement that is indicative an occurrence of the first alert condition;
detecting, via one or more sensors operationally connected to the monitoring device, a second alert condition that is indicative of one or more of motion and sound in the communication range that is above a respective threshold;

transmitting a second alert to the remote implement indicative of the occurrence of the second alert condition unless the monitoring device first detects a recognized mobile device within the communication range of the personal area network or receives notification from the keybox indicative of the recognized mobile device being within the communication range;

transmitting, with the second alert, recorded or streamed activity data of one or more of audible and visible activities to the remote implement, wherein the recorded or streamed activity data is obtained from the one or more sensors operationally connected to the monitoring device;

the recorded or streamed activity includes: sound data, recorded or streamed from an audio sensor operationally connected to the monitoring device; and image data, recorded or streamed from an image sensor operationally connected to the monitoring device.

9. The method of claim 8, wherein: the remote implement is one or more of a mobile device and a cloud service.

10. The method of claim 8, comprising the monitoring device:

communicating with the keybox, via a keybox controller, via the first wireless communication protocol and communicating with the remote implement via a second wireless communication protocol that differs from the first wireless communication protocol, wherein the second wireless communication protocol comprises one or more of TCP/IP protocol and cellular protocol.

11. The method of claim 8, wherein:

the one or more sensors are disposed within a housing of the monitoring device in which the monitoring device controller is housed; or the one or more sensors are spaced apart from the monitoring device, and the method includes the monitoring device:

communicating wirelessly with the one or more sensors.

12. The method of claim 8, wherein:

a plurality of monitoring devices, including the monitoring device, are spaced apart from each other within the communication range, wherein the method includes the monitoring device:

communicating wirelessly with the plurality of monitoring devices;

receiving a transmission of the occurrence of the first or second alert conditions from one or more of the plurality of monitoring devices; and transmitting to the remote implement the occurrence of the first or second alert conditions.

13. The method of claim 8, comprising:

a smart lock wirelessly communicating with the monitoring device to notify of a door opening status.

* * * * *